United States Patent [19]
Nartowski et al.

[11] 3,948,236
[45] Apr. 6, 1976

[54] METHOD OF REGULATING THE FUEL SUPPLY OF INTERNAL COMBUSTION ENGINES

[75] Inventors: Andre Nartowski, Marly-le-Roi; Claude Henault, Chevilly-la-Rue, both of France

[73] Assignees: Regie Nationale des Usines Renault; Automobiles Peugeot, both of France

[22] Filed: Sept. 27, 1973

[21] Appl. No.: 401,280

[30] Foreign Application Priority Data
Nov. 24, 1972 France .............................. 72.41785

[52] U.S. Cl. .......... 123/124 R; 123/119 D; 123/106; 60/307
[51] Int. Cl.² .................... F02M 23/04; F02D 13/00
[58] Field of Search ............ 123/119 D, 124 R, 106; 60/307

[56] References Cited
UNITED STATES PATENTS

| | | | |
|---|---|---|---|
| 3,364,909 | 1/1968 | Mick .............................. | 123/124 R |
| 3,641,767 | 2/1972 | Kraus .............................. | 123/124 R |
| 3,744,464 | 7/1973 | Soltau ............................. | 123/124 R |
| 3,799,301 | 3/1974 | Bentley ........................... | 123/124 R |

*Primary Examiner*—Wendell E. Burns
*Attorney, Agent, or Firm*—Oblon, Fisher, Spivak, McClelland & Maier

[57] ABSTRACT

A method and apparatus for regulating the fuel supply of internal combustion engines having carburetion, specifically the richness of the air-fuel mixture, as a function of engine speed and atmospheric pressure. The richness is controlled by a supply of pressurized air downstream from the carburetor in the intake manifold, which is controlled in a self-evident manner by a bellows and by the amplified pressure at the carburetor venturi. Application to internal combustion engines with carburetors using a pump supplying pressurized air for anti-pollution purposes is intended.

6 Claims, 3 Drawing Figures

U.S. Patent   April 6, 1976   3,948,236
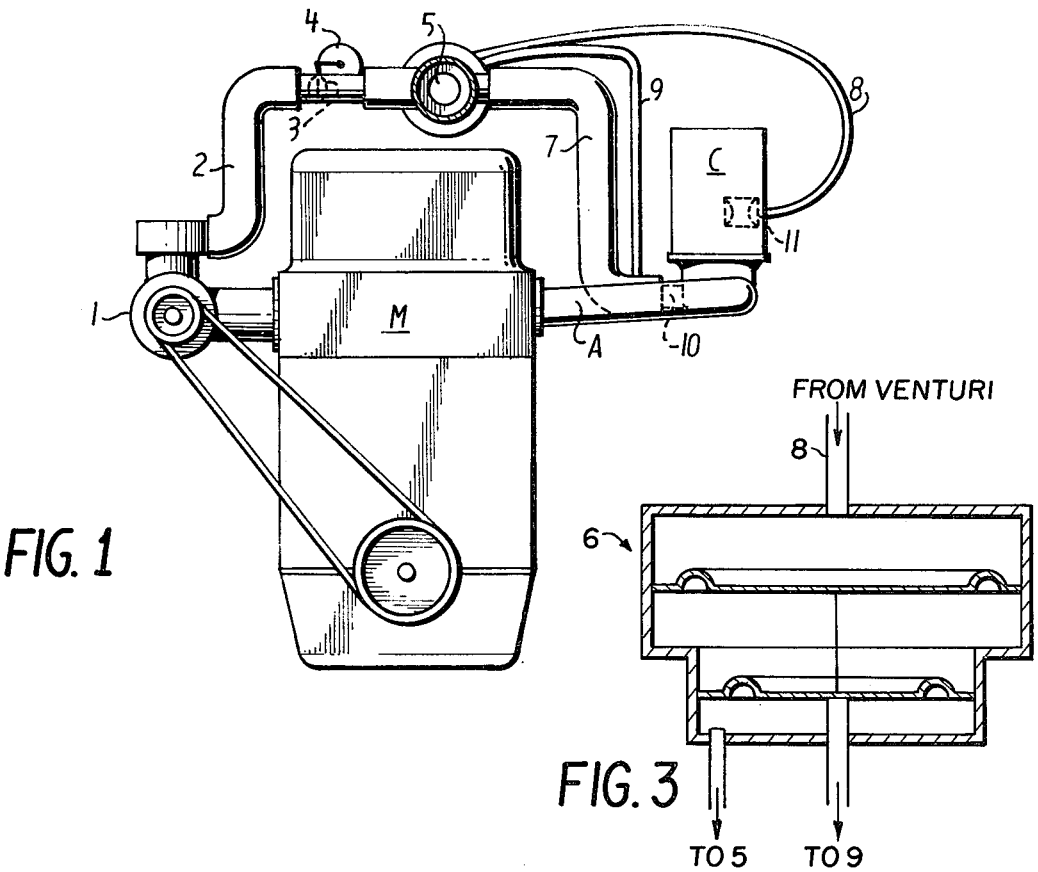
FIG. 1
FIG. 3
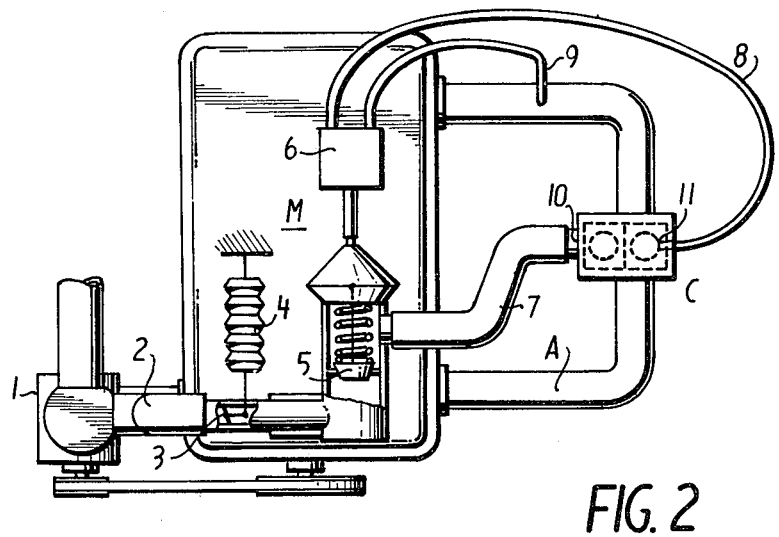
FIG. 2

METHOD OF REGULATING THE FUEL SUPPLY OF INTERNAL COMBUSTION ENGINES

BACKGROUND OF THE INVENTION

1. Field of the Invention

The present invention relates generally to a method of regulating the fuel supply of internal combustion engines, and more particularly, a method for controlling the richness of the air-fuel mixture being suuplied according to motor operating conditions, such as, for example, the barometric pressure, speed and load, in carbureted engines, and an apparatus for carrying out the method disclosed herein.

2. The Prior Art

In such engines, the richness of the air-fuel mixture is usually controlled by the carburetor acting either on its supply or mixing air or its fuel flow.

In the first instance, the supply of air entering the mixing pipe is controlled by a pressure capsule and a vacuum capsule connected to the intake manifold or to the amplified vacuum at the carburetor venturi throat.

In the second case, similar means are used to control a needle valve at the fuel inlet. These methods, which have to control very small and instantaneous changes in flow, unfortunately lack sufficient sensitivity and reliability Thus, the supply of air arriving at vacuum in a mixing pipe through a very narrow orifice, for example, being on the order of 0.7mm measured with a Solex micrometer, is a quantity extremely delicate to control. Likewise, it is well known that fuel needle valves are precise and delicate devices, which easily get out of adjustment. With these methods, repeatable results are difficult to achieve in mass production. They do not work effectively during deceleration when the mixing system is then ineffectual, and they are practically inapplicable, even under normal running conditions, in more complex systems, such as in the case of two-barrel carburetors.

SUMMARY OF THE INVENTION

Accordingly, it is an object of the present invention to provide an improved method and apparatus for regulating the richness of the air-fuel mixture being supplied to a carbureted internal combustion engine which is reliable and sensitive, and which is effective even during deceleration.

Another object of the present invention is to provide an improved method of precisely regulating the fuel supply of internal combustion engines employing complex carburetor systems.

Still another object of the present invention is to provide an improved method of regulating the richness of the air-fuel mixture being supplied to a carburetor internal combustion engine as a function of the atmospheric pressure.

Yet another object is to provide an apparatus for regulating the richness of the air-fuel mixture being supplied to a carbureted internal combustion engine as a function of the atmospheric pressure.

The foregoing and other objects are achieved according to the present invention, which assures reliable and precise control of the air-fuel mixture richness under all operating conditions, including deceleration, even with such complex carburetor systems, by regulating, starting from the known means of altimetric correction and amplifications of pressure at the carburetor venturi throat, an additional pressurized air supply just downstream of the carburetor into the intake manifold of the engine. This pressurized air supply may come from a pump driven by the motor, for example, that used for the injection of air into the exhaust manifold for anti-pollution purposes.

According to one embodiment of the present invention, two valves for controlling the air supply are mounted in series in the piping leading to the intake manifold downstream of the carburetor, one being operated by a bellows and the other by the pressure at the throat of the carburetor amplified by a classical fluid pressure amplifier. In this manner, a much more sensitive regulation can be achieved of a large supply of pressurized air than of a small inflow of air at vacuum. The amplification of the carburetor venturi pressure also increases this sensitivity of response. Moreover, this correction, which no longer depends on the operating conditions in the carburetor, is effective under all running conditions and the carburetor is not disturbed since it is upstream of the inflow of air. Finally, this method permits very effective control of the air-fuel mixture richness at low cost in motors having air injection into the exhaust for anti-pollution purposes, since the air pump essential therefor is thus available for this additional use. No special modification of the carburetor is required, and its adjustment remains unchanged. Further, the inflow at the pressure of the control air into the intake manifold renders its supply less sensitive to instantaneous changes of pressure there.

BRIEF DESCRIPTION OF THE DRAWINGS

Various other objects, features and attendant advantages of the present invention will be more fully appreciated as the same becomes better understood from the following detailed description when considered in connection with the accompanying drawing, wherein like reference characters designate like or corresponding parts in the several views, and in which:

FIG. 1 shows an end view of a motor equipped in accordance with the present invention and adapted to carry out the method thereof;

FIG. 2 shows a top view of the same motor shown in FIG. 1 illustrating the valves controlling the supply of air in partial cross-section; and FIG. 3 is a schematic view of the vacuum amplifier shown in FIG. 2.

DETAILED DESCRIPTION OF THE INVENTION

Referring now to the drawings, a motor system M by which the method of this invention can be practiced is shown having an air pump 1 which also serves to inject air into the exhaust manifold, not shown, and a conduit 2 leading therefrom through a valve 3 to a barometric capsule or bellows 4. The valve 3 is operative to vary the air flow therethrough as a function of the atmospheric pressure.

A diaphragm-operated valve 5 is disposed in a line connected to the outlet of conduit 2 and is connected and controlled by an amplifier 6 of the vacuum in the throat 11 of the carburetor C, to which the amplifier is connected by a tubing 8. The valve 5 varies the air flow according to the motor load and its speed. Another tubing 9 connects the amplifier to the intake manifold A.

Beyond valve 5, the air is conducted from the pump 1 through a pipe 7 to the intake manifold A, the juncture 10 therewith being near the carburetor C and downstream of it.

The operation of the system may be described as follows:

Part of the air from the pump 1 is diverted by the pipe 2 to the valve 3, which is controlled by the barometric bellows 4. At normal atmospheric pressure, that is 760mm of mercury, the valve-bellows assembly is set to close the air passageway. As soon as the atmospheric pressure decreases with an increase in altitude, the bellows 4 begins to open valve 3, whereby the air flow is adjusted.

The purpose of this assembly is to regulate the air supply according to atmospheric pressure, the carburetor being adjusted for normal richness at normal atmospheric pressure.

The air passed by the valve 3 continues on to valve 5 which is controlled by the vacuum sensed in the throat 11 of the carburetor C through the intermediary of vacuum amplifier 6. This amplifier, as heretofore indicated, and is shown in FIGS. 2 and 3, is connected on the one hand to tubing 8 which communicates the vacuum of the throat 11 and on the other hand, to tubing 9 which communicates the intake manifold's vacuum used as the means of amplification. Thus, the amplifier 6 receives two inputs, the one being the weak venturi signal to be amplified and the other being the relatively strong manifold vacuum for its source of power. The output signal of the amplifier thus has adequate strength to operate the valve 5 and is accurate, repeatable and is further almost proportional to the weak venturi signal input. The purpose of the assembly consisting of valve 5 and vacuum amplifier 6 therefore is to regulate the air supply according to the motor speed and load. Desired amplification at higher speeds and moderate accelerations when the engine manifold vacuum is typically reduced is thus continued to be provided through such amplification, so that at full load and at maximum speed, when there is a higher vacuum in the throat 11 of the carburetor, the opening of the valve and the supply of air are also at a maximum.

Beyond valve 5, the air is conducted by pipe 7 to the intake manifold A, the juncture 10 being downstream of the carburetor C. Thus, the amount of air injected may be so regulated that the richness of the air-fuel mixture does not change in spite of a change in the atmospheric pressure.

The vacuum amplifier 6 may be a commercially available type of fluid amplifier using the intake manifold vacuum as a power source. For example, the vacuum amplifier EGR of the RANCO Company may be utilized. This amplifier is disclosed in greater detail in U.S. Pat. No. 3,739,797, being dated June 19, 1973.

The subject method and apparatus of the invention permits compliance with future anti-pollution standards which require the use of catalytic systems for the exhausts of internal combustion engines. To assure the mechanical durability of these systems, it is necessary to limit the operating temperature of the exhaust's catalyst container which is strictly dependent on limiting the richness of the air-fuel mixture, which is only possible provided that the richness remains constant.

All the known systems heretofore available which correct the richness according to changes in the altitude by means of the carburetor such as by air adjustment, fuel adjustment, and the like, are unreliable and lack adequate precision characteristics. Corrections by these systems become very complex and very difficult to control, especially if the motor has a two barrel carburetor. The invention disclosed herein, on the other hand, is particularly suited to such applications.

Obviously, many modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A method of regulating the fuel supply of carbureted internal combustion engines as a function of altitude, speed and load on the motor, characterized by the steps of:
   controlling the richness of the air-fuel mixture by supplying additional pressurized air into the intake manifold downstream of the carburetor; and
   controlling said supply of pressurized air in a self-evident manner with a barometric responsive bellows and in accordance with the amplified pressure sensed at the carburetor venturi throat.

2. A method of regulation as set forth in claim 1 characterized by closing said bellows-operated valve at normal atmospheric pressure and opening the same continuously as altitude increases.

3. A method of regulation as set forth in claim 1, wherein the increased vacuum at the carburetor venturi causes further opening of the corresponding control valve and a correlative increase in the supply of air.

4. A method of regulation as set forth in claim 1, characterized by supplying said additional air with an air pump driven by a motor which simultaneously supplies pressurized air to an anti-pollution device in the exhaust.

5. An apparatus for regulating the fuel supply of carbureted internal combustion engines as a function of altitude, speed and load on the motor, comprising:
   an air pump;
   conduit means connecting said air pump and said intake manifold of said engine for injecting air from said air pump into said intake manifold near the carburetor and downstream thereof;
   a fluid amplifier connected to the vacuum of the throat of the carburetor of said engine and to the intake manifold;
   a diaphragm-operated valve in said conduit means being operative by said fluid amplifier;
   a second valve in said conduit means between said air pump and said fluid amplifier; and
   means responsive to the barometric pressure for controlling the degree of opening of said second valve.

6. Apparatus according to claim 5, wherein said pressure responsive means is a bellows device.

* * * * *